US012578041B2

(12) United States Patent
    Naber

(10) Patent No.:     US 12,578,041 B2
(45) Date of Patent:        Mar. 17, 2026

(54) PIPE CONNECTOR AND AN ASSEMBLY OF A PIPE CONNECTOR WITH AT LEAST TWO PIPES

(71) Applicant: Naber Holding Gmbh & Co., Nordhorn (DE)

(72) Inventor: Hans-Joachim Naber, Nordhorn (DE)

(73) Assignee: Naber Holding GmbH & Co., Nordhorn (DE)

( * ) Notice: Subject to any disclaimer, the term of this patent is extended or adjusted under 35 U.S.C. 154(b) by 257 days.

(21) Appl. No.: 17/749,438

(22) Filed: May 20, 2022

(65) Prior Publication Data

US 2022/0373114 A1     Nov. 24, 2022

(30) Foreign Application Priority Data

May 21, 2021     (DE) ...................... 10 2021 113 246.0

(51) Int. Cl.
    *F16L 21/03*         (2006.01)
    *F16L 47/08*         (2006.01)
(52) U.S. Cl.
    CPC .............. *F16L 21/03* (2013.01); *F16L 47/08* (2013.01)
(58) Field of Classification Search
    CPC ............... F16L 25/0009; F16L 25/0036; F16L 25/0045; F16L 25/0054; F16L 25/12;
    (Continued)

(56) References Cited

U.S. PATENT DOCUMENTS

| | | | |
|---|---|---|---|
| 5,163,718 A | 11/1992 | Cannon | |
| 6,494,497 B1 * | 12/2002 | Kertesz ................... | F16L 33/22 |
| | | | 285/903 |

(Continued)

FOREIGN PATENT DOCUMENTS

| | | |
|---|---|---|
| CN | 212718555 U | 3/2021 |
| DE | 2944984 A1 | 6/1980 |

(Continued)

*Primary Examiner* — Aaron M Dunwoody
(74) *Attorney, Agent, or Firm* — Harness, Dickey & Pierce, P.L.C.

(57)                ABSTRACT

A pipe connector for connecting at least two pipes, wherein the pipe connector has a first receptacle with a first insertion opening for inserting a pipe and a second receptacle with a second insertion opening for inserting a pipe, wherein the pipe connector has at least one preferably circumferential stop arranged between the first and the second insertion opening on an inner side of the pipe connector, which stop determines a maximum insertion depth of a pipe into the first and/or second receptacle, the pipe connector having at least one, preferably circumferential, sealing lip arranged on the inner side of the pipe connector between the first and/or the second insertion opening and the stop, characterized in that the pipe connector comprises a flexible region of a deformable, compressible or expandable and/or elastic material arranged between the first and the second insertion opening, so that the first receptacle is translationally and/or rotationally displaceable relative to the second receptacle. The invention further relates to corresponding arrangements of a pipe connector having at least two pipes connected thereto.

18 Claims, 13 Drawing Sheets

(58) Field of Classification Search
CPC ....... F16L 27/107; F16L 27/108; F16L 27/11;
F16L 27/12; F16L 21/002; F16L 21/005;
F16L 21/03; F16L 21/08; F16L 47/08;
F16L 51/02; F16L 51/021; F16L 51/022;
F16L 51/023; F16L 51/024; F16L 51/025;
F16L 27/0857; F16L 27/1017; F16L
27/1025; F16L 51/03
See application file for complete search history.

(56) References Cited

U.S. PATENT DOCUMENTS

2012/0274065 A1 * 11/2012 Knapp .................. F16L 17/025
285/417
2019/0316805 A1 10/2019 Bruckbauer et al.

FOREIGN PATENT DOCUMENTS

| | | | |
|---|---|---|---|
| DE | 20-2006-006756 | U1 | 7/2006 |
| DE | 10-2016-220527 | A1 | 4/2018 |
| DE | 102018206642 | A1 | 10/2019 |
| EP | 2759779 | A1 | 7/2014 |
| EP | 3529538 | B1 | 12/2020 |
| EP | 3504483 | B1 | 1/2022 |
| FR | 3030671 | A1 | 6/2016 |
| WO | 2009-153394 | A1 | 12/2009 |
| WO | 2018036800 | A1 | 3/2018 |

* cited by examiner

112

117

117

PIPE CONNECTOR AND AN ASSEMBLY OF A PIPE CONNECTOR WITH AT LEAST TWO PIPES

CROSS-REFERENCE TO RELATED APPLICATIONS

This application claims the benefit and priority of German Patent Application No. 10 2021 113 246.0 filed May 21, 2021, the disclosure of which is hereby incorporated by reference herein in its entirety.

FIELD

The invention relates to a pipe connector for connecting at least two pipes, the pipe connector having a first receptacle with a first insertion opening for inserting a pipe and a second receptacle with a second insertion opening for inserting a pipe, the pipe connector having at least one stop arranged between the first and the second insertion opening on an inner side of the pipe connector, preferably circumferential stop arranged between the first and the second insertion opening on an inner side of the pipe connector, which stop determines a maximum insertion depth of a pipe into the first and/or second receptacle, wherein the pipe connector has at least one, preferably circumferential, sealing lip arranged on the inner side of the pipe connector between the first and/or the second insertion opening and the stop.

BACKGROUND

Such pipe connectors are used, for example, in kitchen construction to connect pipes of a pipe system with each other. The system can be used, for example, to transport vapors or fumes drawn in by an extractor hood to a wall box and thus out of the kitchen. A pipe connector is known, for example, from EP 2 759 779 A1.

Usually, the pipes to be connected with the pipe connector are inserted into the pipe connector to create a fluidic connection of the pipes. However, leakage and leaks can occur in the process, especially if the pipes to be connected are not precisely aligned. This can cause vapors or fumes to escape from the pipe system to be removed from the kitchen.

SUMMARY

Therefore, it is an aspect of the present invention to provide a pipe connector having a better leakage seal. Furthermore, an arrangement of a pipe connector with at least two pipes connected thereto is provided.

According to the preferred embodiment of the invention, the pipe connector has a flexible region of a deformable, compressible or expandable and/or elastic material arranged between the first and second insertion openings, so that the first receptacle can be displaced in translation and/or rotation relative to the second receptacle. Due to the flexible region, stresses caused by misalignment or twisting of the pipes to be connected are avoided in the pipes, the pipe connector and in particular at the junction of a pipe with the pipe connector, so that loosening of the connection and/or connection gaps are effectively avoided. The pipe connector can bridge a pipe offset due to the flexible region. This results in an improved seal against leakage. The flexible region may be made of or include a plastic material. For example, the flexible region may be or comprise an elastomer, such as a thermoplastic elastomer (TPE). The flexible region may comprise or consist of, for example, PVC, polyethylene (PE), and/or polypropylene (PP). The flexible region may comprise or consist of rubber, e.g., natural rubber and/or silicone rubber. The flexible region may comprise or consist of silicone and/or a silicone-containing material. Alternatively or additionally, the plastic may be, for example, a shape memory polymer. When the tubular connector is released, provision may be made for the flexible region to return to a predetermined shape, e.g., to reverse a deformation of the flexible region caused by the connection.

The pipes to be connected can be flat ducts, round pipes or the like. It may also be provided that the pipe connector can connect a flat duct to a round pipe or the like. The corresponding receptacles of the pipe connector may be adapted to the geometry and/or cross-section of the pipes to be connected. It may also be possible to use the pipe connector to connect more than two pipes to one another. The pipe connector can have a corresponding number of receptacles for this purpose. The pipe connector may have a substantially rectangular and/or flat shape. The pipe connector may have a substantially round shape.

At least one of the pipes to be connected can be made of or have a plastic, a sheet metal or a metal alloy. In the case of sheet metal pipes in particular, improved leak-tightness can be ensured by a pipe connector according to the invention due to the increased rigidity compared to conventional plastic pipes.

The pipe connector may be made of or include a plastic, such as ABS or PVC. Alternatively or additionally, the pipe connector may be made of or have a metal or sheet metal. The pipe connector may have a Shore A hardness of 30-50. With such a Shore A hardness, the pipe connector may have better pipe insertion behavior or the insertion of a pipe into the pipe connector may be facilitated.

The pipe connector can have at least one retaining element, which can be set up to fix a pipe inserted into the first and/or the second receptacle at least in sections or at points with the pipe connector. The retaining element can preferably be arranged at or near the stop at least in sections. Thus, a pipe connector with flexible section described above may also have a corresponding retaining element. The retaining element may be integrally formed with the stop. The pipe connector may have a plurality of retaining elements. The retaining elements may be regularly spaced apart. Thus, the spaced apart retaining elements may be individual or separate elements. In particular, it may be provided that a retaining element is not formed by a groove or the like extending completely around the inside of the pipe connector. This may improve the flow through the pipe connector, since there is no circumferential detachment edge through the retaining element, while at the same time providing a good connection between the pipe and the pipe connector. For example, a retaining element may have a width of $\frac{1}{50}$ to $\frac{1}{10}$ of the inner circumference of the pipe connector or receptacle, an inner side of the pipe connector or receptacle, and/or the stop. However, it may also be provided that at least one retaining element is formed on, at or with the stop in a circumferential manner at least in sections over a wide range. In this case, a retaining element may have, for example, a width of more than $\frac{1}{10}$ (but preferably less than 1/1) of the inner circumference of the pipe connector or the receptacle and/or the stop. If the first and/or the second receptacle is substantially rectangular or has a substantially rectangular shape, e.g. for flat ducts, it may be provided that retaining elements are arranged only on the two longer sides. The retaining element may project into the first and/or second receptacle. It may be provided that the retaining element does not extend over the complete first and/or second receptacle from the stop to the first and/or second insertion opening, but only partially projects into the respective receptacle. Thus, an improved stable and loadable connection of the pipe connector to a pipe may result, and thus an improved sealing against leakage. By "sectionally arranged retaining element" it may be meant that the width of the retaining element arranged at or near the stop may correspond to a fraction of the inner circumference of the pipe connector, the inner circumference of the first or the second receptacle or the stop corresponding to a section. It may also be meant that a retaining element is disposed at or near a portion of the stop, wherein at least one further retaining element may be disposed at or near at least one further portion of the stop. Thus, the pipe may be or become fixed by the retaining element in sections or at points. The retaining element can have a width of, for example, $\frac{1}{50}$ to $\frac{1}{10}$ of an inner circumference of the pipe connector or receptacle and/or the inner side of the pipe connector or receptacle and/or an inner circumference of the stop. It may be provided that exactly one retaining element is arranged on one, more or all inner sides of the pipe connector in each case. The retaining element may be integrally formed with the stop. The retaining element may be or comprise a clip or the like, or be clip-like. It may be provided that more than one retaining element is arranged on the stop. For example, exactly two (or more) retaining elements may be provided per stop. The retaining elements can be arranged and/or distributed symmetrically along the stop, for example with respect to an axis of symmetry of the pipe connector. The two or more retaining elements can reduce concave deflection of the pipe connector and/or a received pipe. In addition, tightness may also be increased. Similarly, a symmetrical arrangement of a plurality of retaining elements can act.

The pipe connector may include a flexible region disposed between the first and second insertion openings and made of a deformable, compressible or expandable and/or elastic material such that the first receptacle is translationally and/or rotationally displaceable relative to the second receptacle. Thus, a tubular connector with retaining element described above may also include a flexible region. The flexible region may comprise or include a plastic and/or rubber.

The retaining element may have a T-shape, L-shape, C-shape or the like, wherein a web of the retaining element with the inner side of the pipe connector may form a pipe end receptacle for receiving a pipe end of a pipe inserted into the first and/or the second receptacle. The web may be disposed in and/or project into the respective receptacle. The pipe end receiving means may provide or may provide an increased contact area of a received pipe end in the pipe end receiving means. By receiving the pipe end in the pipe end receptacle, a stable and secure connection of the pipe to the pipe connector can be or be provided.

At least one of the at least one sealing lip can be arranged in the pipe end receptacle. However, all sealing lips may also be arranged in the pipe end receptacle. Preferably, the at least one sealing lip can be arranged on an inner side of the pipe connector and/or on the web. In this way, with the pipe end received in the pipe end receptacle, good and firm contact can be achieved between the pipe end and the sealing lip, and thus a good seal. If the pipe connector has a plurality of sealing lips, at least two of the sealing lips may have a different height and/or thickness. If the pipe connector has at least three sealing lips, two of the sealing lips can be spaced differently from each other in each case.

The retaining element and/or the web can have a contact press-on guide on a side facing the inside of the pipe connector, so that a cross section of the pipe end receptacle is tapered at least in sections in the direction of insertion of the pipe end. This can ensure a secure fit of the pipe end in the pipe end receptacle and improve the seal. However, it is also possible to provide for the press-on guide to run along the entire retaining element, so that the cross section of the pipe end receptacle is tapered in the insertion direction not only in sections but over the entire pipe end receptacle.

The contact press-on guide may be inclined at least in sections relative to the inner side at an angle $\alpha_{109}$. The angle may be $0° \leq \alpha_{109} \leq 20°$. The angle may be $0° \leq \alpha_{109} \leq 15°$. The angle $\alpha_{109}$ may provide self-locking with a pipe end received in the pipe receptacle.

The retaining element may comprise a clip element so that, when the pipe is received in the pipe end receptacle, the retaining element may be or can be releasably connected to a corresponding complementary connecting element of the pipe end and/or the pipe via the clip element. Thus, a good seal and a secure connection of the pipe to the pipe connector may be provided, and the connection may be or may be conveniently releasable.

The pipe connector may comprise at least one latching element arranged in the first and/or second receptacle, preferably on the inner side, which is adapted to releasably connect the pipe to the pipe connector with a latching lug of a pipe inserted in the receptacle. In at least one embodiment, the retaining element may be or comprise the detent element, wherein it may be provided that no retaining element is arranged at or near the stop. However, the detent element may also be provided in addition to the retaining element, for example in, arranged at or near the stop. In this case, the detent element or the detent connection can additionally support and/or reinforce the connection of the pipe to the pipe connector by the retaining element.

The pipe connector can have at least one pipe connector clip element (preferably arranged on the inside) in the first and/or second receptacle. The pipe connector can be detachably connected, preferably clipped, to a pipe inserted into the first and/or second receptacle by means of the pipe connector clip element.

The pipe connector may have at least one, preferably at least two, axes of symmetry about which the pipe connector and/or the retaining element may be axisymmetric, mirror-symmetric or rotationally symmetric. In particular, it may be provided that the pipe connector has no specific and/or preferred connection direction and/or flow direction. This may result in an easier and faster assembly of the pipe connector or the pipe system to be assembled. At least one axis of symmetry may be perpendicular to the flow direction. It may be provided that the retaining element is symmetrical or has at least one axis of symmetry. The axis of symmetry of the retaining element can be aligned in such a way that the pipe end receptacles formed by the retaining element and/or the contact press-on guide of the retaining element are symmetrical.

The ratio or quotient of a height to a depth of the pipe connector can be greater than or equal to 1.25, preferably greater than or equal to 1.5. The ratio or quotient of a width to a depth of the pipe connector can be greater than or equal to 2.5, preferably greater than or equal to 3. The ratio or quotient of a diameter of the pipe connector to a depth can be greater than or equal to 1.5, preferably greater than or equal to 2 . . . . This can result in a narrow pipe connector while providing a good seal or connection between the pipes.

The pipe connector can have at least two sealing lips each between the stop and the first receptacle and the second receptacle, wherein the distance between the two sealing lips in each case can be smaller than a length of the sealing lips. In the case of a pipe received in the pipe connector, the respective sealing lips can thus overlap. This can result in a better seal.

The flexible region may have or be a bellows, at least in sections. The bellows can be or have a bellows.

The flexible region and/or the bellows can have contours. The contours can be or have folds. For example, the contours may be sinusoidal or angular. If the contours are angular, the flow through the pipe connector may be improved compared to sinusoidal contours. It may be provided that the height of the contours is greater than the distance between the contours. If the contours are angular and the height of the contours is greater than their respective distance from each other, the flow through the pipe connector may be further improved. The flexible region and/or the bellows may have at least one outwardly facing contour. It may be provided that the flexible region and/or the bellows have exactly three outwardly facing contours. Such a number of three contours can thereby enable a comparatively good mechanical stability with simultaneous flexibility. In particular, with three compared with, for example, five contours, "evasive behavior", i.e. relative movement of the contours with respect to one another, can be improved and pressure losses can be reduced. In addition, a force introduction into the flexible region can be improved with three contours compared to, for example, five; with a central force introduction from the pipe insertion area (socket) to the flexible region, an improved behavior under pressure load can result, whereby a "swerving" can be minimized.

The outside of the pipe connector may be or have a stiff and/or hard material with a first E_module. The inside of the pipe connector may be or have a soft and/or compliant material with a second E-modulus compared to the material of the outside. The first E-modulus may be greater than the second E-modulus. By E-modulus, in particular, one or the modulus of elasticity of the respective materials may be meant. The tubular connector may be of and/or have a two-component construction. Due to the stiff and/or hard material, the pipe connector can have a high stability. Due to the soft and/or compliant material, a good seal can be or be achieved. The hard material may be or comprise a plastic, for example a thermoplastic or thermoset plastic, or a metal or sheet metal. The soft material may be or comprise an elastomer, such as a thermoplastic. The soft material may be or comprise a TPE and/or a silicone. The silicone may be or comprise a silicone-containing material.

In at least one embodiment, the pipe connector can have a first, preferably circumferential, stop arranged between the flexible region and the insertion opening of the first receptacle on the inside of the pipe connector, and a second, preferably circumferential, stop arranged between the flexible region and the insertion opening of the second receptacle on the inside of the pipe connector, preferably circumferential, stop arranged between the flexible region and the insertion opening of the second receptacle on the inside of the pipe connector, wherein the pipe connector can have at least one first retaining element arranged at or near the first stop on the inside at least in sections and at least one second retaining element arranged at or near the second stop on the inside at least in sections. It may be provided that exactly two (or more) retaining elements may be arranged both at the first stop and at the second stop.

The pipe connector can have at least two sealing lips arranged on the inside of the first receptacle and/or the second receptacle. This allows very good leak tightness to be achieved. The pipe connector can fulfill at least the second highest leak tightness class (class C). It may also be provided that the sealing lips are arranged on, at and/or fluidically in front of the receptacle.

The first receptacle and/or the second receptacle can have a preferably circumferential lead-in chamfer at an outer edge, wherein the cross-sectional surface of the receptacle can be tapered at least in sections in the region of the lead-in chamfer. The lead-in chamfer can be or have a chamfer. The insertion chamfer allows a pipe to be inserted easily and conveniently into the receptacle, in particular if an interference fit of the pipe in the receptacle is provided.

According to the invention, there is provided an assembly of a pipe connector described above and at least two pipes connected to the pipe connector via the first and second receptacles, wherein a. the longitudinal axes of the two pipes can be oriented relative to each other at an angle between 1° and 15°, and/or b. the pipe ends of the pipes connected to the pipe connector may have a distance and/or offset along the longitudinal axis of one or both pipes which may be 1 to 5 cm, preferably 1 to 2 cm, greater or less than one or the depth of the pipe connector, and/or c. the two pipes may have a distance and/or offset substantially perpendicular to the longitudinal axis of the pipes with respect to each other, for example in the direction of extension of one or the height of the pipe connector and/or one or the width, which may be between 1 to 5 cm, preferably between 1 to 2 cm.

The pipe connector thus allows in particular the joining of two pipes that are not exactly aligned with each other without stresses occurring in the connector or the joint. Thus, a long-lasting or non-detaching and secure connection can be or is provided. The pipe connector can preferably have a flexible region with which the offset or distance between the two pipes is compensated.

Alternatively or additionally, according to the invention, one or the assembly of a pipe connector and at least two pipes connected to the pipe connector via the first and second receptacles is provided, wherein a. an outer cross-section and/or outer circumference of the pipes can be larger than an inner cross-section of at least one of the receptacles, so that at least one pipe can be fixed under an interference fit in the at least one receptacle with the pipe connector, and/or b. at least one of the receptacles may have on an inner side at least one or the latching element and at least one of the pipes may have at least one or the complementary latching lug, wherein the at least one pipe may be releasably secured in the at least one receptacle by the latching connection formed by the latching element and the latching lug with the pipe connector, and/or c. at least one of the receptacles can have at least one or the pipe connector clip element on an inner side (118), wherein the at least one pipe in the at least one receptacle can be clipped to the pipe connector via the pipe connector clip element, and/or d. the retaining element can form a or the pipe end receptacle with an inner side of the pipe connector on, at or in at least one of the receptacles, wherein the pipe inserted into the receptacle is received with one or the pipe end in the pipe end receptacle, wherein the pipe can be (positively or non-positively) connected to the pipe connector via the pipe end and the pipe end receptacle, and/or e. the retaining member may comprise at least one or the clip member and at least one of the pipes or a pipe end of at least one of the pipes may comprise a or the complementary member with the clip member, wherein the pipe may be detachably connected to the pipe connector via the clip member and the complementary member.

Arrangements with any combination of these connections or connecting elements are also possible and conceivable.

DRAWINGS

The invention is explained in more detail with reference to the following figures. Thereby shows:

Figure 9:
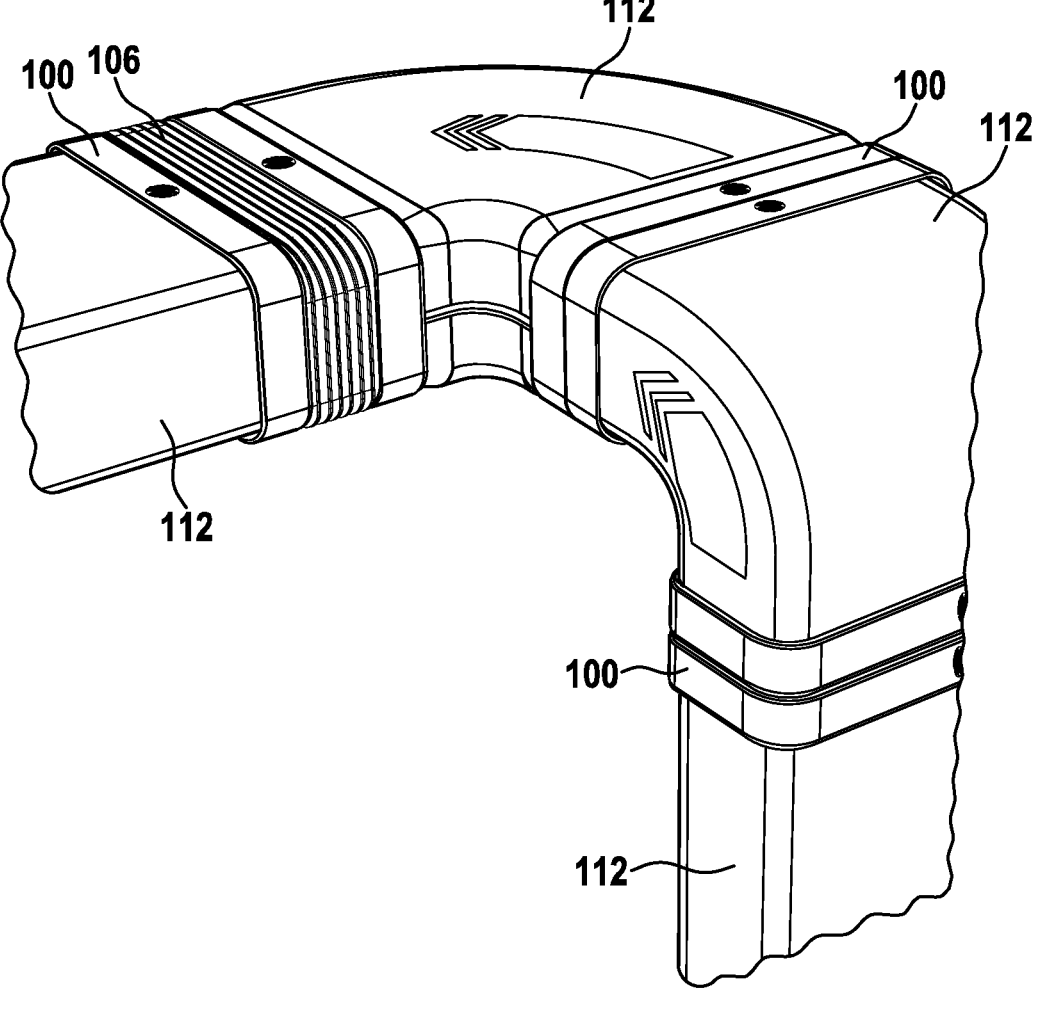
Figure 10:
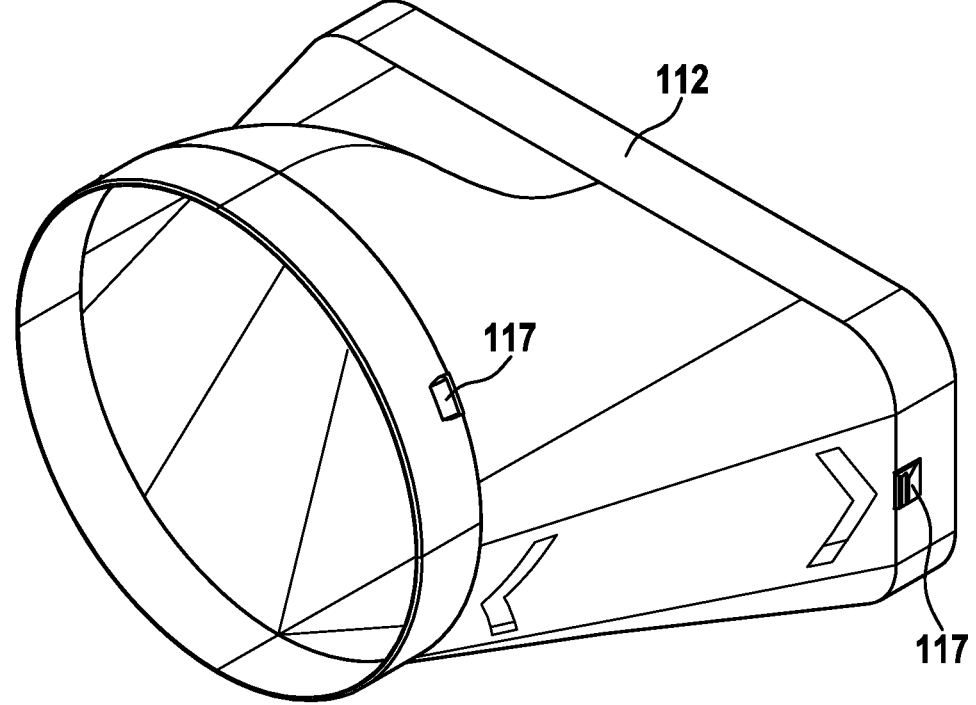
Figures 11A, 11B, 11C, 11D:
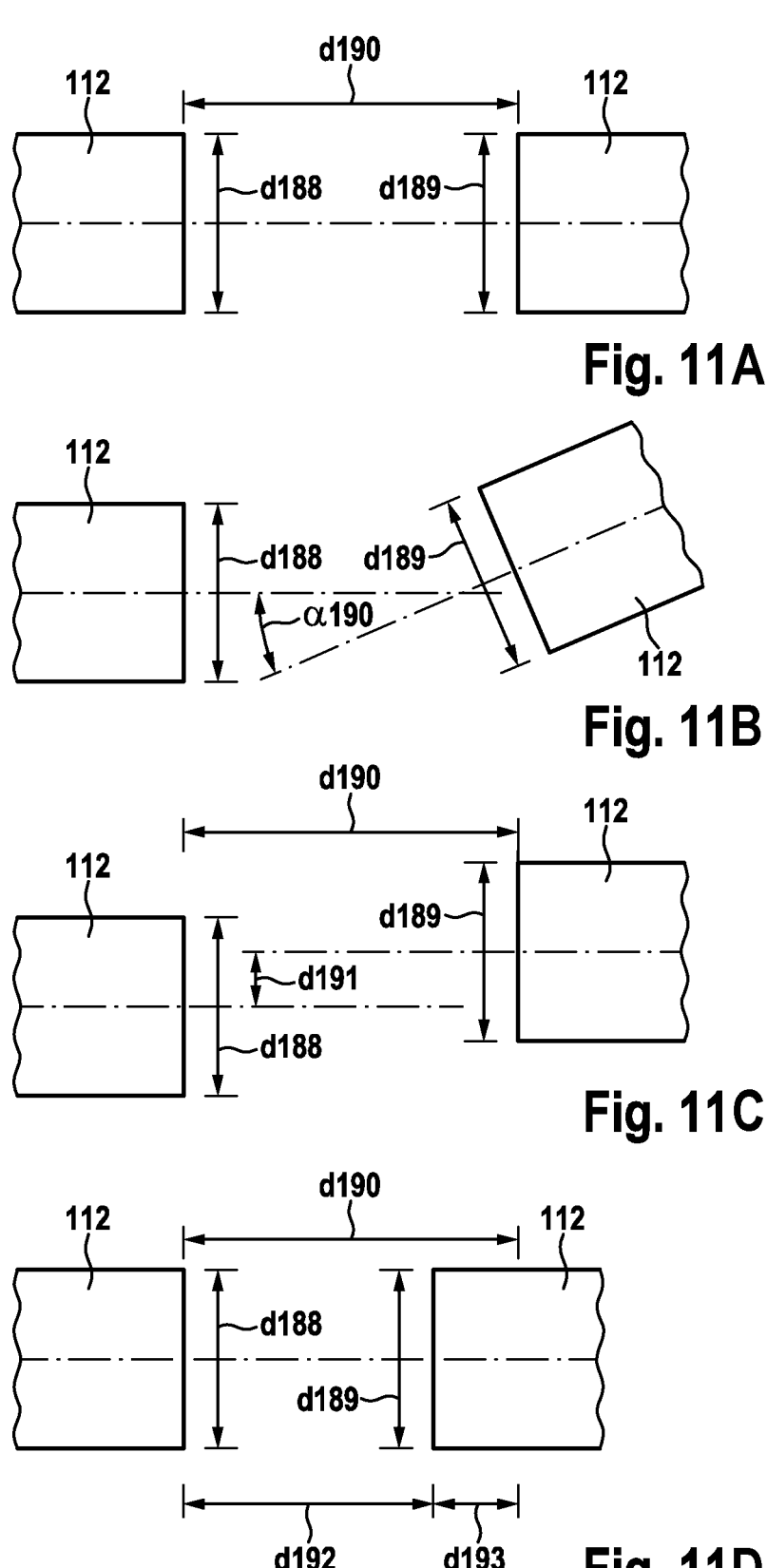
Figure 12:
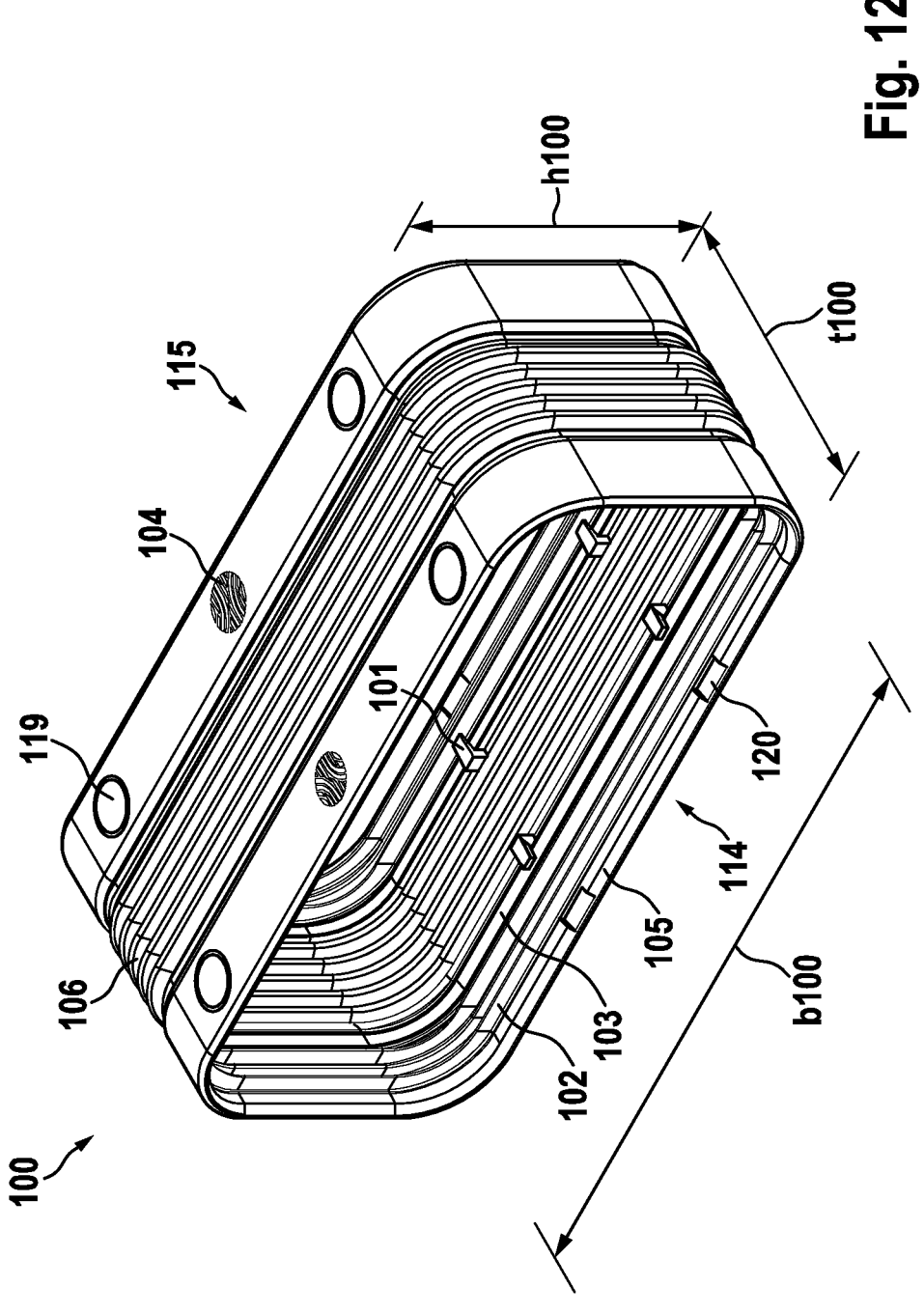
Figures 13A, 13B:
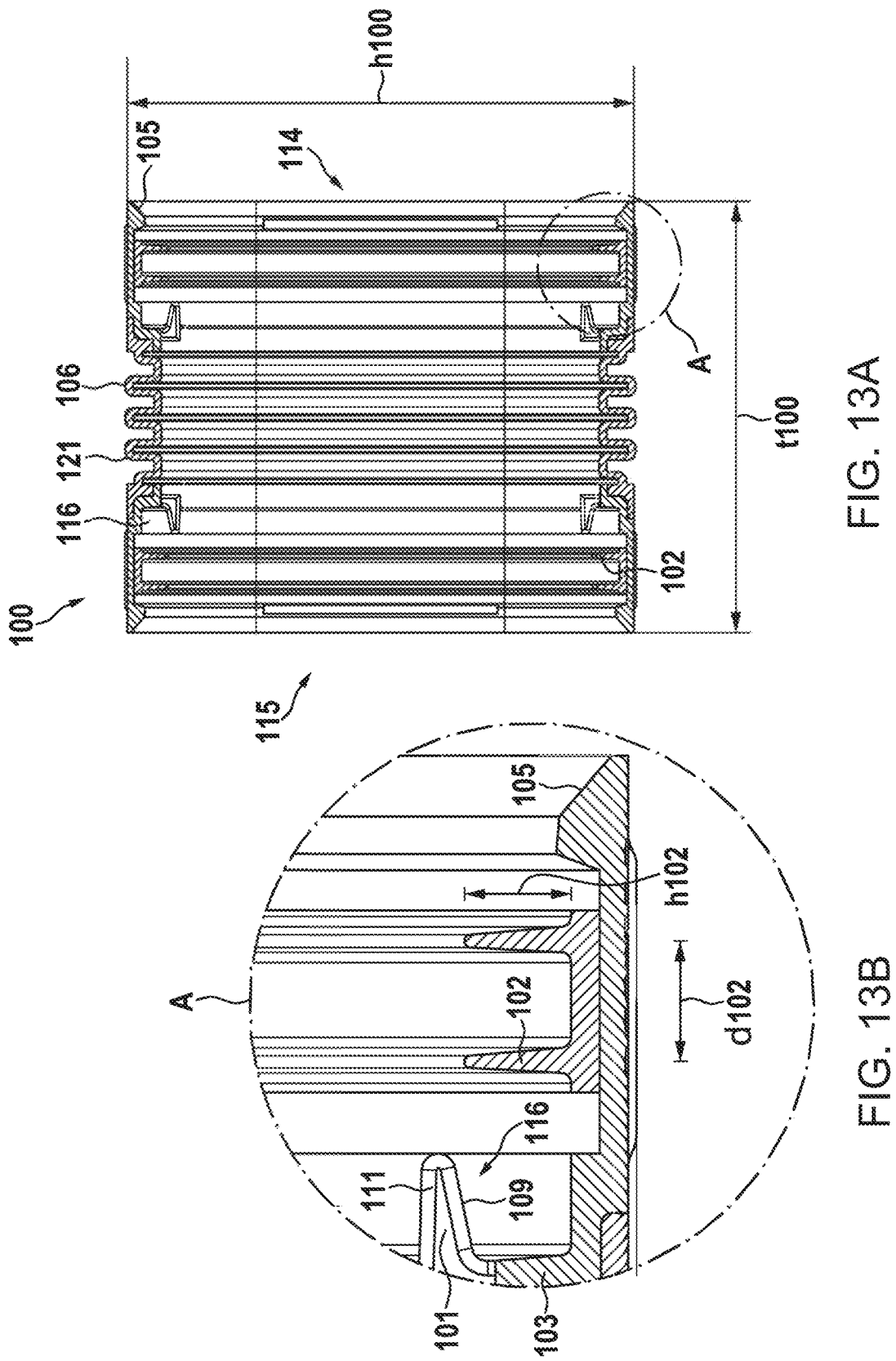

FIGS. 8A, 8B, 8C, and 8D are schematic diagrams of sealing lips;

FIG. 9 is an arrangement of a pipe connector according to the invention with two pipes connected thereto;

FIG. 10 is an example of a pipe to be connected with a pipe connector with a locking lug;

FIG. 11A is a schematic example of one arrangement of two pipes connected by a pipe connector (not shown);

FIG. 11B is a schematic example of another arrangement of two pipes connected by a pipe connector not shown);

FIG. 11C is a schematic example of a further arrangement of two pipes connected by a pipe connector not shown);

FIG. 11D is a schematic example of still another arrangement of two pipes connected by a pipe connector not shown);

FIG. 12 is another embodiment of a pipe connector according to the invention; and FIG. 13A is a cross-sectional view of an embodiment of a pipe connector according to the invention, and FIG. 13B illustrates area A of FIG. 13A.

DETAILED DESCRIPTION

Figure 1:
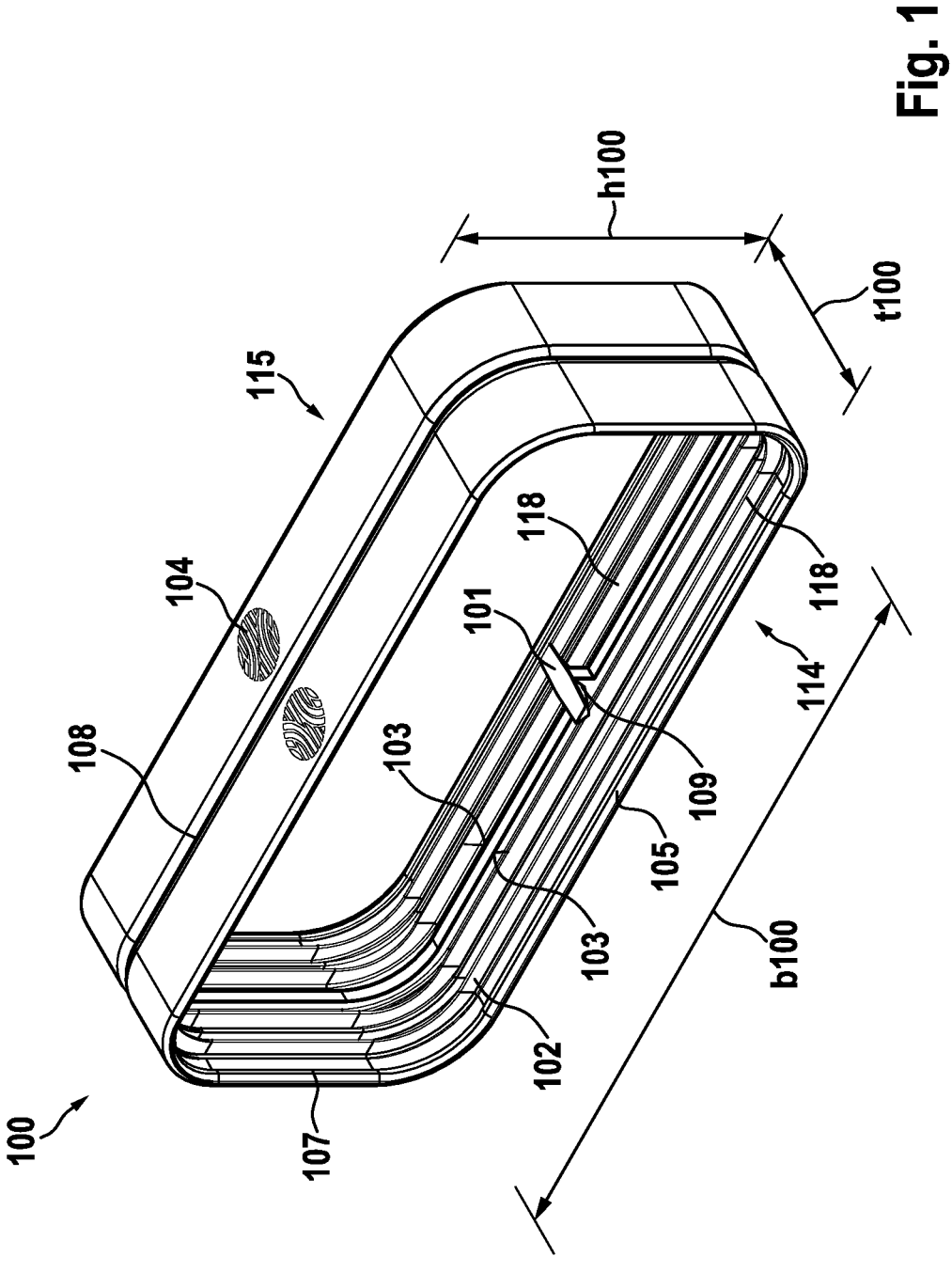
FIG. 1 is an embodiment of a pipe connector according to the invention.
Figure 2:
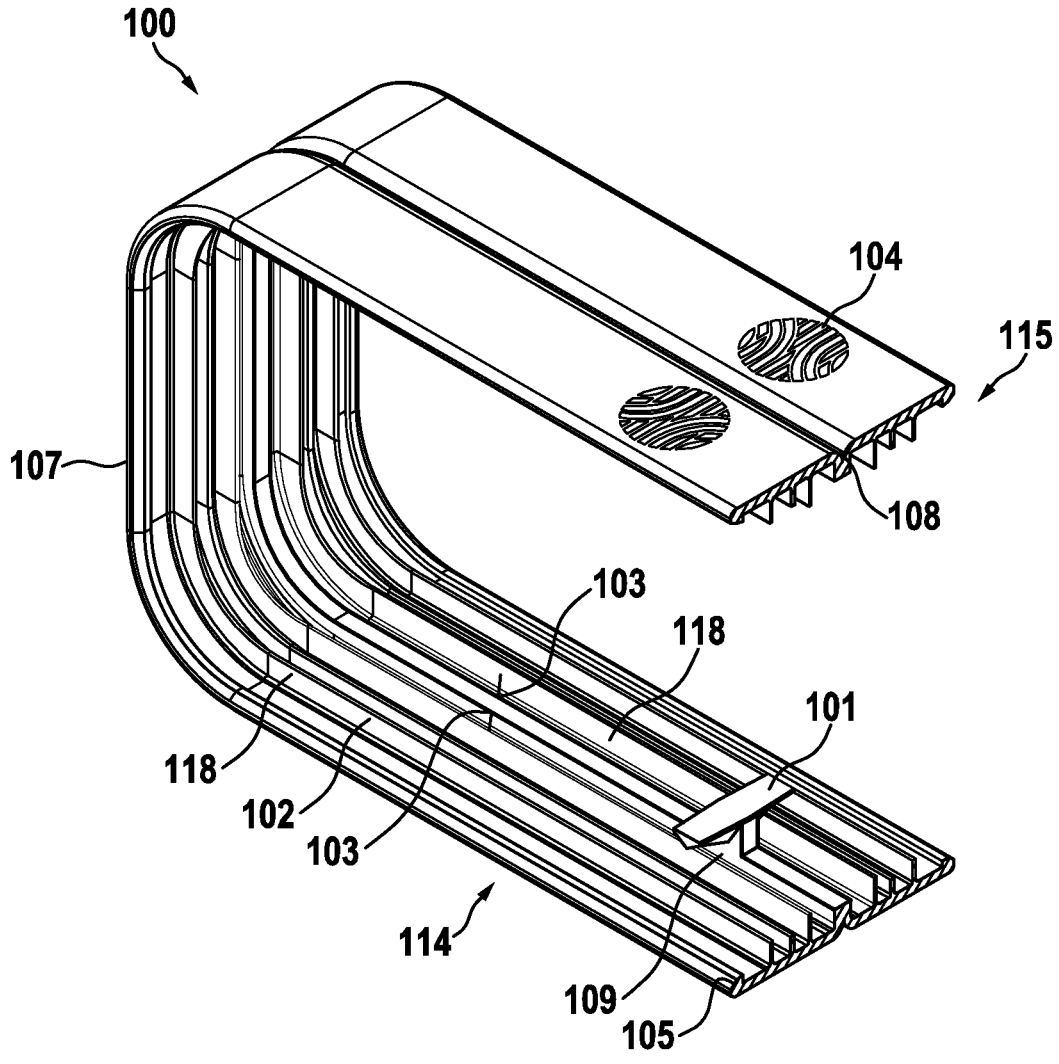
FIG. 2 is the embodiment of a pipe connector according to the invention shown in FIG. 1.

A first embodiment of a pipe connector 100 according to the invention is shown in FIGS. 1 and 2, wherein the pipe connector 100 includes a flexible region 106 not shown in FIGS. 1 and 2. The pipe connector 100 has a first receptacle 114 for receiving a first pipe or pipe end, and a second receptacle 115 for receiving a second pipe or pipe end. A stop 103 is arranged between the two receptacles 114, 115 on the inner side 118 of the pipe connector. The stop 103 can in particular be arranged circumferentially. The stop 103 can thus determine a defined insertion depth of one or more pipes 112 in the pipe connector 100. For example, a pipe 112 can be inserted into the pipe connector 100 through the first receptacle 114 until the pipe 112 or its pipe end contacts the stop 103. The stop 103 can thus serve as a stopper. At least one or a plurality of sealing lips 102 are arranged on the inner side 118 of the pipe connector 100 between the stop 103 and the receptacle 114, 115 and/or the insertion opening of the receptacle. The sealing lips 102 are preferably arranged circumferentially. In the embodiment of the pipe connector 100 shown in FIGS. 1 and 2, three sealing lips 102 are arranged between the insertion opening of the first receptacle 114 and the stop 103, and between the insertion opening of the second receptacle 115 and the stop 103, respectively. The sealing lips 102 fluidically seal pipes 112 inserted into the pipe connector 100. For example, if two pipes 112 are inserted into the receptacle 114, 115 of the pipe connector 100 shown in FIG. 1, the two pipes 112 are fluidically sealed to each other. Due to the plurality of sealing lips 102 of the pipe connector 100, a particularly good seal is achieved. For example, the pipe connector 100 shown in FIG. 1 with its three sealing lips 102 in each case exceeds the requirements with regard to leak tightness and fulfills at least the second highest sealing class, class C.

The pipe connector can have a Shore A hardness between 30-50. This can facilitate the insertion of a pipe into the pipe connector, or the pipe connector can have improved insertion behavior.

The tubular connector 100 may include at least one retaining element 101. The retaining element 101 may be disposed at or near the stop 103. It may be provided that retaining element 101 is integrally formed with the stop 103. The retaining element 101 may be L-shaped, T-shaped, C-shaped, or the like, or have a corresponding shape. The retaining element 101 may be used to press and/or push a pipe 112 inserted into the pipe connector 100 against the inner wall of the pipe connector 100. It may also be provided that a pipe end of a pipe 112 inserted into the pipe connector 100 is or will be clamped to the retaining element 101 and the inner wall of the pipe connector 100. In this regard, the retaining element 101 may be arranged on the inner side 118 of the pipe connector 100 such that an inserted pipe 112 or its pipe end is or will be pressed against the sealing lips 102. The pipe connector 100 may include a plurality of retaining elements 101. The respective retaining elements 101 may be regularly spaced apart from each other. Exemplary embodiments of the retaining element 101 are further described below in FIGS. 6 and 7. It may be envisaged that the tubular connector comprises a plurality of retaining elements 101. In this case, the retaining elements 101 may be regularly spaced from one another, for example along the stop 103. However, it may also be provided that at least one retaining element 101 is formed completely or at least in sections on, at or with the stop circumferentially. It may be provided to arrange exactly one retaining element on at least one or more inner sides of the pipe connector. The ratio of the width of the retaining element 101 to the inner circumference of the pipe connector 100, to the inner side 118 of the pipe connector on which the retaining element 101 may be arranged, or to the inner circumference of the stop 103 may be between $1/50$ to $1/10$. The retaining element 101 may thus be narrow compared to, for example, the width of the receptacle 114, 115 of the pipe connector 100.

The pipe connector 100 and/or the first receptacle 114 and/or the second receptacle 115 may include an insertion chamfer 105. The insertion chamfer 105 may be or include a chamfer. The insertion chamfer 105 may be disposed on an inner side of the insertion opening of the respective receptacle 114, 115. The insertion chamfer 105 may facilitate insertion of a pipe 112 or its pipe end into the pipe connector 100. The insertion slope 105 may be arranged circumferentially. It may be provided that the outer dimensions of the pipe 112 and the first receptacle 114 and/or the second receptacle 115 are such that an interference fit or a clamp fit results when the pipe 112 is inserted into the pipe connector 100. In this case, the insertion chamfer 105 may facilitate assembly or insertion of the tubular member 112 into the tubular connector 100.

Alternatively or additionally, the pipe 112 may be or be connected to the pipe connector 100 via a latching connection. For this purpose, the pipe connector 100 may include a suitable latching element 107 or a corresponding connecting element that can be connected or latched to a complementary latching lug 117 of the pipe 112. This allows the pipe 112 to be easily and releasably secured to the pipe connector 100. The pipe connector 100 may also include a plurality of corresponding latching elements 107 and/or connecting elements, each of which may be regularly spaced from one another. The latching element 107 and/or the connecting element may be disposed on an inner surface 118 of the tubular connector 100. The latching element 107 and/or the connecting element may be disposed at or near the first receptacle 114 and/or the second receptacle 115 and/or the inlet openings thereof. An exemplary pipe 112 and/or pipe end with a corresponding latching lug 117 is shown in FIG. 10. Alternatively or additionally, the pipe connector 100 may include at least one pipe connector clip element not shown in FIG. 1 or 2. The pipe connector clip element may be disposed in the first receptacle 114 and/or the second receptacle 115. Preferably, the pipe connector clip element may be disposed on an inner surface of the first receptacle 114 and/or the second receptacle 115. If the tubular connector 100 comprises a plurality of tubular connector clip elements, the tubular connector clip elements may be arranged circumferentially, preferably equidistantly, in the first receptacle 114 and/or the second receptacle 115. The pipe connector clip element may correspond to or be shaped and/or formed like the latch 117 shown in FIG. 10.

The pipe connector 100 may have at least one axis of symmetry as shown in FIGS. 1 and 2. The pipe connector 100 and/or the retaining element 101 may be mirror symmetric, axisymmetric, and/or rotationally symmetric or have a corresponding shape. In particular, it may be provided that the pipe connector 100 does not have a preferred connection direction, orientation, orientation or flow direction. This may facilitate assembly or connection of a pipe 112 to the pipe connector 100.

The tubular connector 100 may include a groove 108 on an exterior surface thereof. The groove 108 may be arranged circumferentially. The groove 108 may serve, for example, as a handling element or grip element for facilitating assembly. The tubular connector may alternatively or additionally comprise a haptic element 104, which may serve as a handling element or grip element. It may be provided that the haptic element 104 comprises a visual and/or tactile or palpable type designation or code of the pipe connector 100, which may comprise, for example, information regarding dimensions, material, or other properties of the pipe connector 100. This makes it particularly easy to select the pipe connector that just fits during assembly. The haptic element can indicate a preferred flow direction of the pipe connector.

The pipe connector 100 may have a ratio of a width $b_{100}$ and/or height $h_{100}$ to a depth $t_{100}$, such that $b_{100}/t_{100} \geq 2.5$ and/or $h_{100}/t_{100} \geq 1.2$, preferably $b_{100}/t_{100} \geq 2.5$ and/or $h_{100}/t_{100} \geq 3$. This can result in a pipe connector 100 that requires little space. Nevertheless, a good seal or leak tightness can be achieved by a plurality of sealing lips 102.

As shown in FIGS. 1 and 2, the pipe connector 100 may be configured to fluidically seal substantially rectangular pipes 112 to one another. In particular, the pipe connector 100 can be configured to connect flat ducts to each other in a fluidically sealing manner. For this purpose, in particular the width $b_{100}$ and the height $h_{100}$ of the pipe connector or the respective receptacles 114, 115 can be suitably selected.

Figure 3:
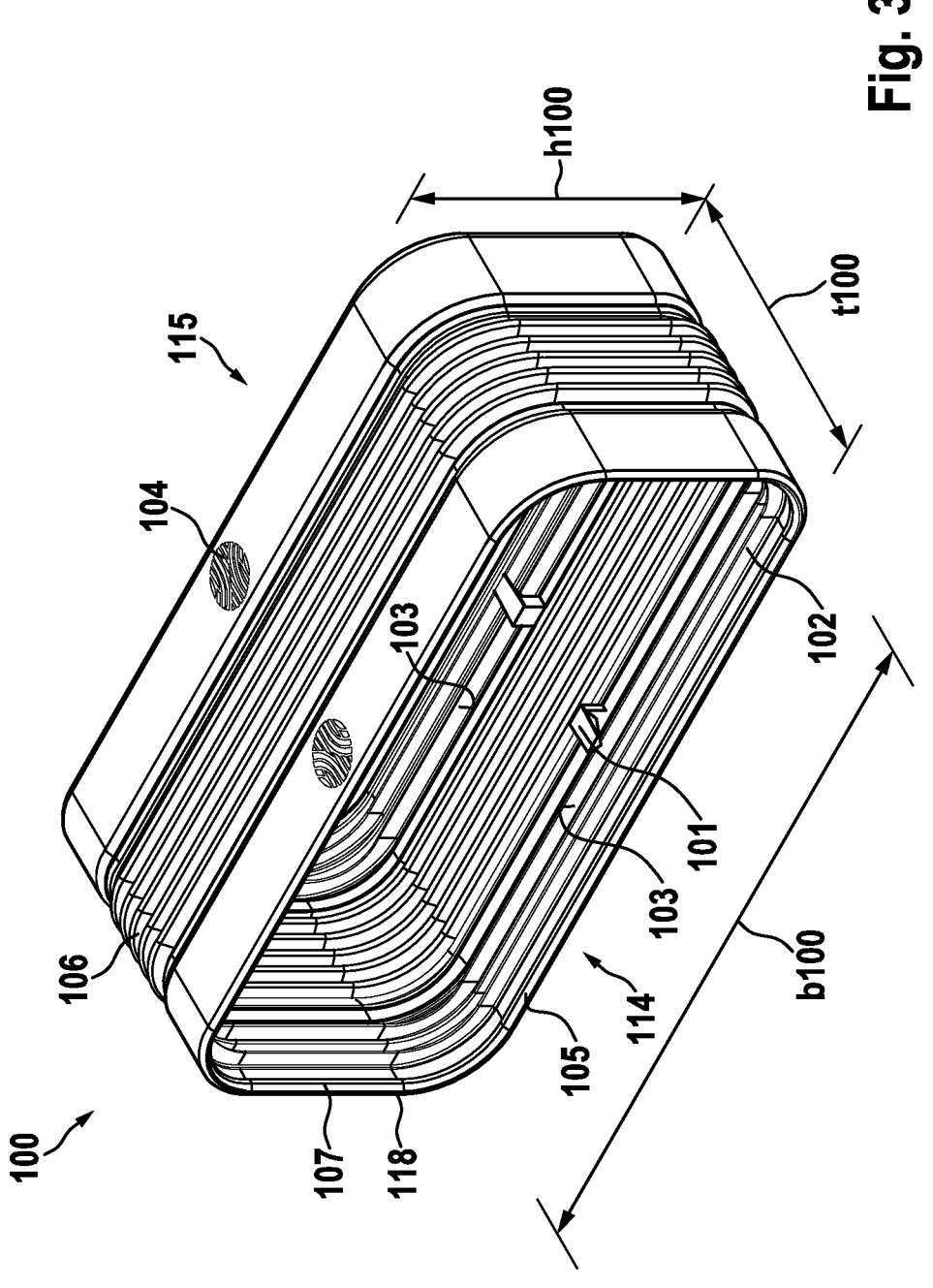
FIG. 3 is a further embodiment of a pipe connector according to the invention.

As shown in FIG. 3, the tubular connector 100 includes a flexible region 106. The tubular connector shown in FIG. 3 may include at least one, more, or all of the features described with reference to FIGS. 1 and/or 2. The flexible region 106 may be disposed between the first receptacle 114 and the second receptacle 115. The flexible region 106 may allow relative displacement, such as translational or rotational displacement, of the first receptacle 114 to the second receptacle 115 or vice versa. To this end, the flexible region 106 may comprise or include a suitable material, such as a soft and/or deformable plastic. The flexible region may be compressible and/or expandable. The flexible region 106 may be or comprise a bellows, for example a bellows. Thus, such a pipe connector 100 can be used to conveniently connect pipes 112 that are not exactly aligned with each other, such as at an angle and/or offset pipes 112. For example, the pipe connector 100 can connect two pipes 112 that are aligned at an angle of up to 15° to each other through the flexible region 106. Alternatively or additionally, the pipe connector 100 can be used to bridge an offset between two pipes 112 of, for example, one to 2 cm in any direction, such as in a vertical direction. Alternatively or additionally, length differences of, for example, 1 to 3 cm can be compensated for during assembly by the flexible region 106, for example by stretching or compression, if, for example, one or both of the pipes 112 to be connected have been cut too short and/or too long. Exemplary pipes 112 arranged under a corresponding offset are shown in FIG. 11. By means of the flexible region 106, stresses in the pipe connector 100, the pipes 112 and the corresponding joints and connecting elements can thus be reduced and/or avoided in particular.

In the embodiment example of a tubular connector 100 shown in FIG. 3, the flexible region 106 is symmetrically disposed midway between the first receptacle 114 and the second receptacle 115. The embodiment example shown in FIG. 3 also has two stops 103 and two retaining elements 101. The respective stops 103 and retaining elements 101 are thereby arranged on the inner side 118 of the pipe connector 100 adjacent to the flexible region 106. The retaining elements 101 may be L-shaped as shown in FIG. 3. Of course, such a symmetrical arrangement as shown in FIG. 3 is not mandatory, however.

The embodiment example of a pipe connector 100 shown in FIG. 3 also has sealing lips 102, insertion chamfer 105 and latching element 107 as described with reference to FIGS. 1 and 2. The dimensions, in particular height $h_{100}$, width $b_{100}$ and/or depth $t_{100}$, may be substantially the same as those of the embodiment example shown in FIGS. 1 and 2.

FIGS. 12 and 13 show another embodiment of a pipe connector 100 according to the invention. The pipe connector shown in FIGS. 12 and 13 may have at least one, more or all of the features described with reference to FIGS. 1, 2 and/or 3. The pipe connector 100 may include two or more retaining elements 101 for each stop 103. It may be envisaged that the pipe connector comprises exactly two retaining elements 101 per stop 103. In this way, a good compromise between not too complicated manufacturing and good connection and tightness between the pipe connector 100 and a pipe received therein can be achieved. For example, a concave deflection of the pipe connector 100 and/or a received pipe can be reduced. It may be envisaged that the two or more retaining elements 101 may be distributed and/or arranged symmetrically and/or uniformly along the respective stop 103. In the embodiment shown in FIG. 12, the two retaining elements 101 per stop 103 are arranged symmetrically with respect to the pipe connector 101, in particular in the direction of the width $b_{100}$.

For example, as shown in FIG. 12, the tubular connector 100 and/or the insertion slope 105 may include at least one recess 120. The recess may be arranged to be aligned with the retaining element 101. The recess 120 may serve to facilitate insertion of the pipe, for example clips or fasteners of the pipe. However, it may also be envisaged that the recess 120 itself serves or is arranged to serve as a fastening means.

The pipe connector 100 may include at least one spacer 119. The spacer 119 may be disposed on an exterior surface of the tubular connector 100. The spacer 119 may be or include a rubber element and/or a rubber coating. For example, the spacer may space a surface of an installed pipe connector from a surface of a wall, a kitchen element, a pipe, another pipe connector, or the like.

FIG. 13 shows a cross-sectional view of a pipe connector according to the invention, which may correspond, for example, to one of the embodiments shown in FIG. 3 or FIG. 12. The flexible region 106 may be or comprise a bellows, such as a bellows. The flexible region 106 may have folds 121. The folds 121 may be or correspond to contours. It may be envisaged that the tubular connector may have exactly three folds 121 as shown in FIG. 13. The folds may face outwardly as shown in FIG. 13. The folds may be sinusoidal in shape. However, it may be envisaged that the folds may be angular and/or have an angular shape as shown in FIG. 13. If the pleats are angular, compared to sinusoidal pleats, the flow through the flexible region may be improved. In particular, a pressure drop of the flow may be or become reduced. The distance between two folds can be smaller than the height of the folds, cf. e.g. FIG. 13. This can result in small radii of curvature of the folds. The flow can thus be or become further improved, in particular the pressure drop can be or become further reduced. At least one embodiment of the pipe connector 100 has exactly three outwardly facing folds 121 as shown in FIG. 13. However, it may also be provided that the pipe connector 100 has more or less than three folds 121. A number of three folds 121 may provide a good compromise between flexibility and stability. Compared to, for example, a pipe connector having five pleats, a pipe connector having three pleats may have lower pressure losses due to reduced "flexing" of the flexible region 106. In addition, there may be a better transfer of force from the pipe insertion area or sleeve to the flexible region 106.

It may be provided that the flexible region 106 is connected to the pipe insertion areas or sleeves, e.g. welded or glued. However, it may also be provided that the flexible region is made integral with at least one or all of the pipe insertion areas or sleeves.

Section A of FIG. 13 shows an enlargement of the sealing region. The sealing region may include at least two, and in some embodiments exactly two, sealing lips 102. One, more, or all of the sealing lips 102 may be disposed on, at, and/or fluidly upstream of a pipe end receptacle 116. In some embodiments, it may be provided that at least one of the sealing lips 102 is disposed within the pipe end receptacle 116. Sealing lips 102, retaining element 101, and pipe end receptacle 116 are further described below with reference to FIGS. 6 through 8.

Figure 4:
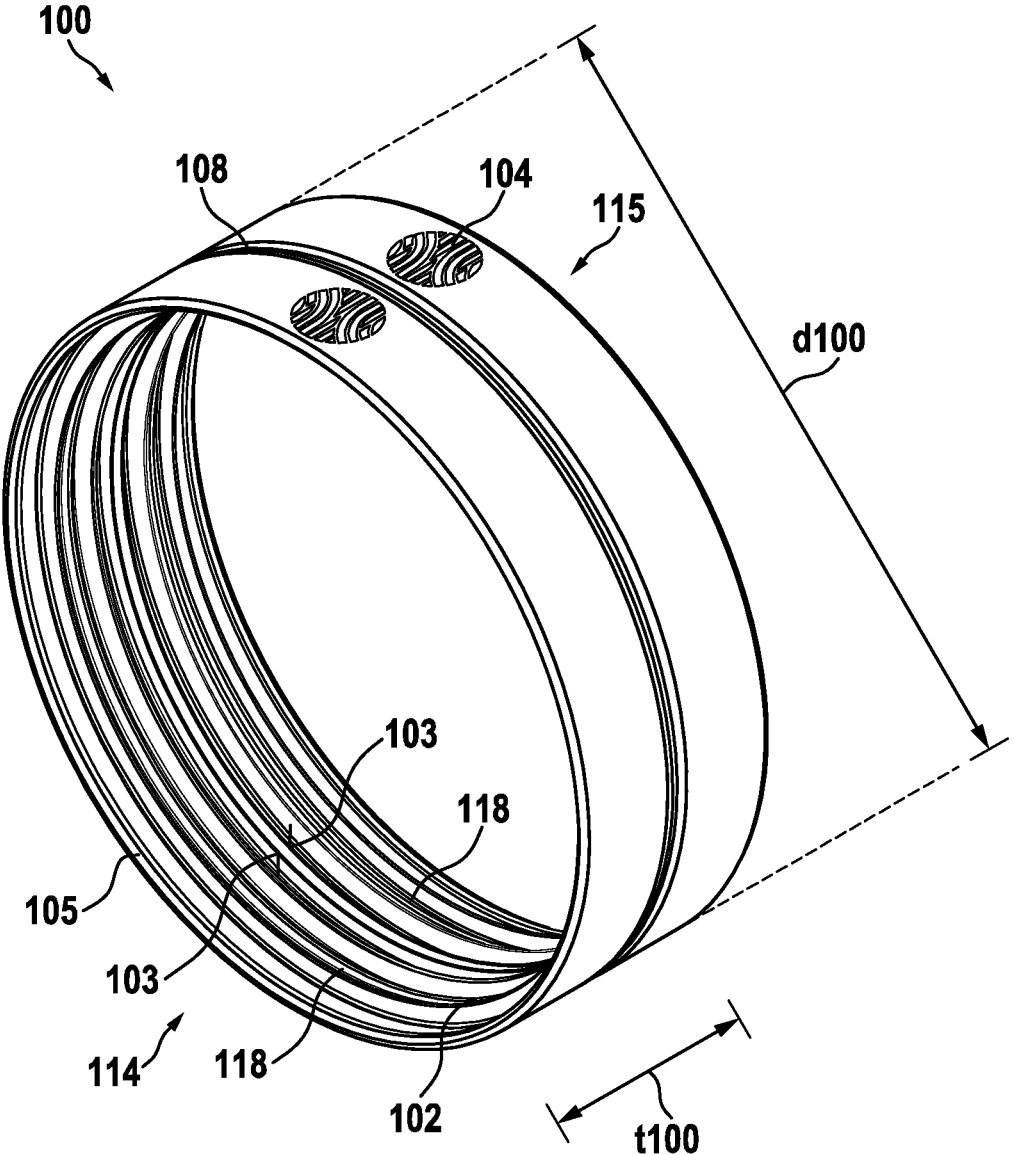
FIG. 4 is still another embodiment of a pipe connector according to the invention.
Figure 5:
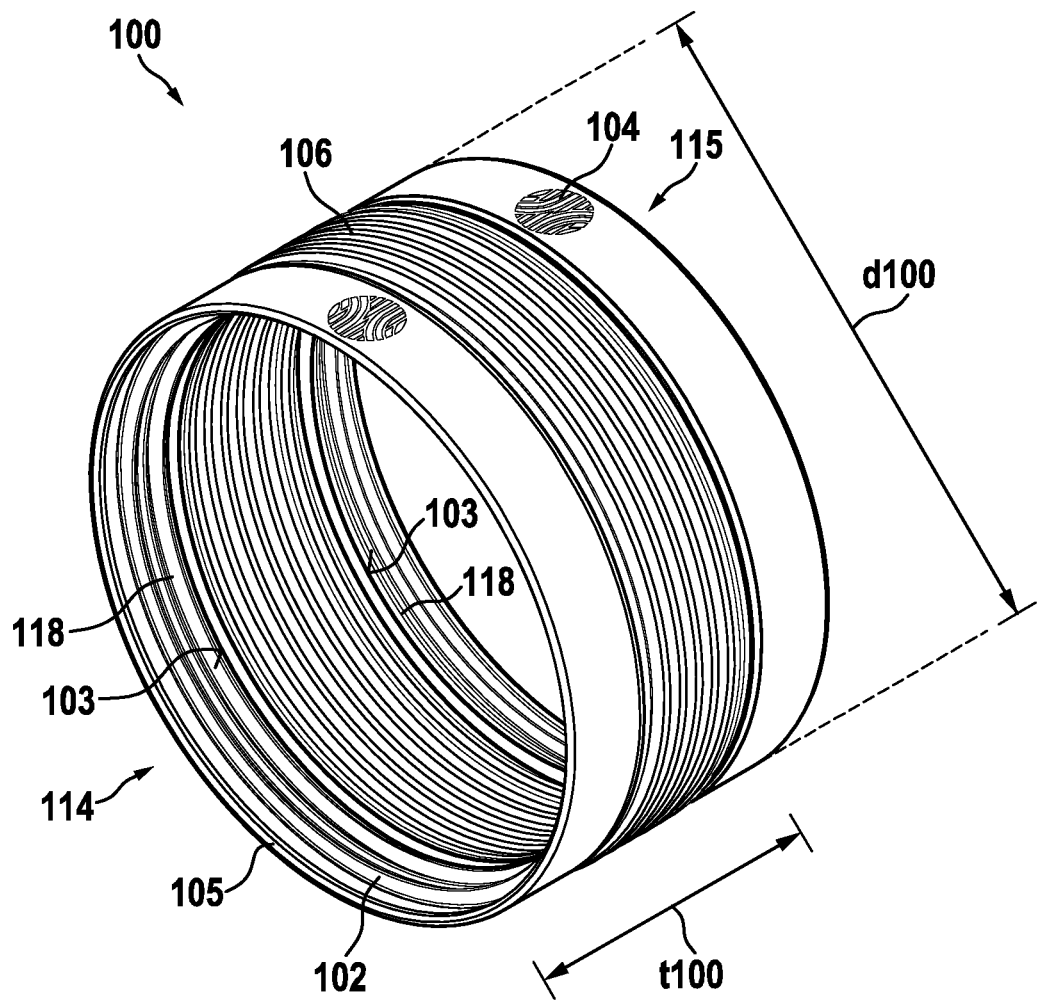
FIG. 5 is still another embodiment of a pipe connector according to the invention.

The further embodiments of a pipe connector 100 shown in FIGS. 4 and 5 differ from the embodiments shown in FIGS. 1 to 3, among other things, in that round pipes can be connected with them. The pipe connectors 100 of FIGS. 4 and 5 include a flexible region 106, although this is shown only in FIG. 5. The pipe connectors 100 shown in FIGS. 4 and 5 may have at least one, several or all of the features described with respect to FIGS. 1 to 3, or may differ therefrom only in their shape (round versus square/flat). In this regard, the ratio of the diameter $d_{100}$ to the depth $t_{100}$, $d_{100}/t_{100}$ may be $\geq 1.5$, preferably $d_{100}/t_{100} \geq 2$. An exemplary circular connector may have a diameter $d_{100}=150$ mm and a depth $t_{100}=60$ mm. It may be provided that the pipe connector 100 for a round pipe shown in FIG. 4 and/or the pipe connector 100 with flexible region 106 shown in FIG. 5, as shown and described in FIGS. 1 to 3, comprises one or more retaining elements 101 (not shown in FIGS. 4 and 5). Similarly, it may be envisaged that the embodiments corresponding to those described and illustrated in FIGS. 1 to 3 do not comprise retaining elements 101. Likewise, embodiments are conceivable that have a first receptacle 114 for a flat channel and a second receptacle 115 for a round channel or pipe, or vice versa.

Figure 6A:
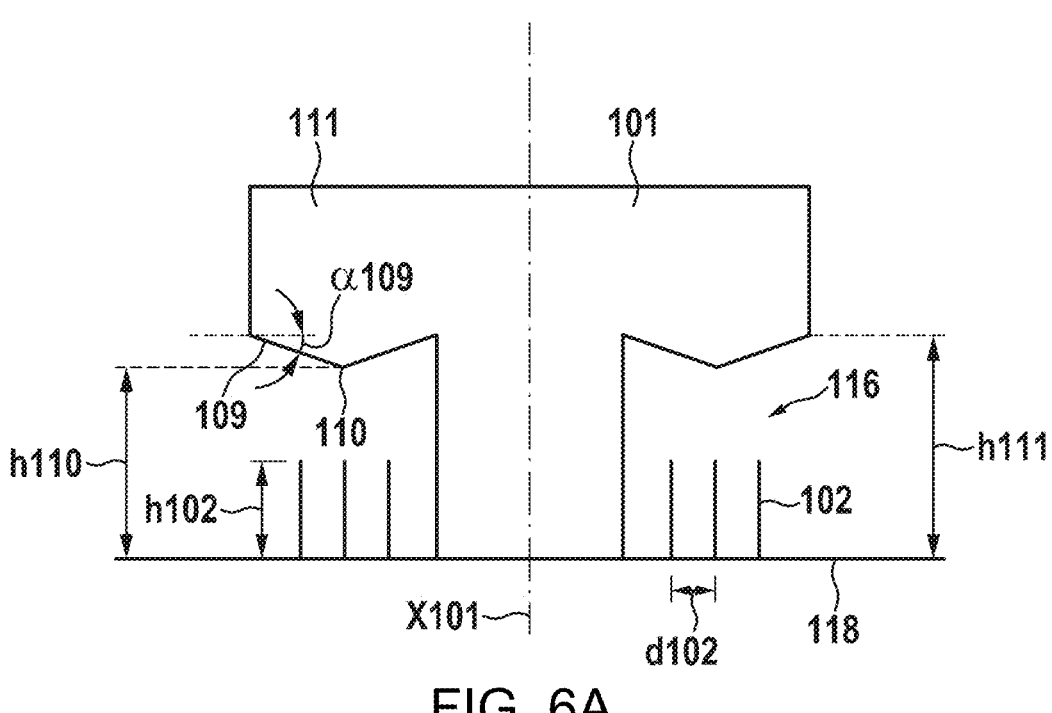
FIGS. 6A and 6B are schematic representations of two embodiments of a retaining element.
Figure 6B:
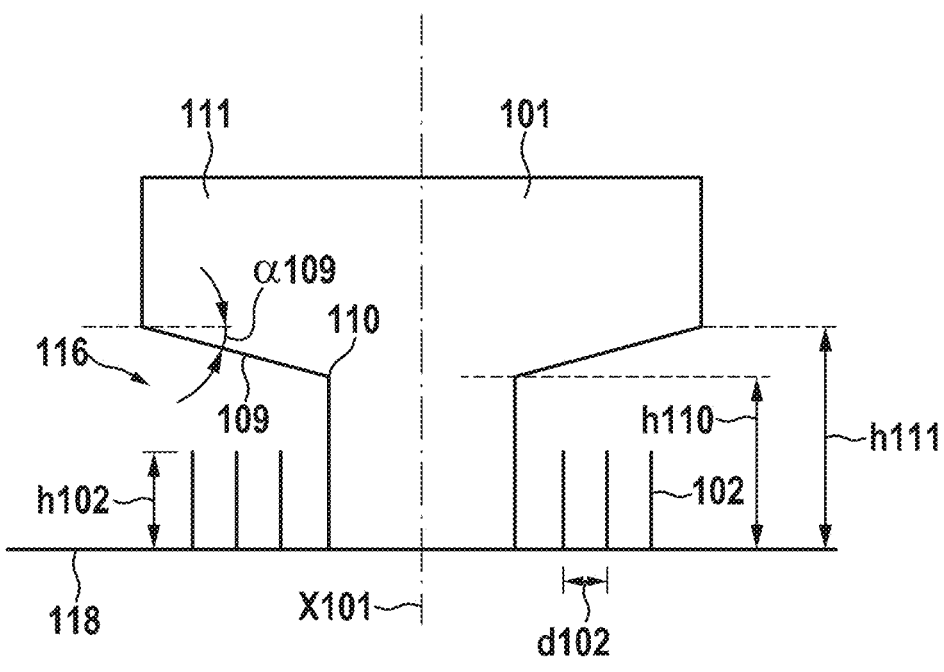
Figure 7:
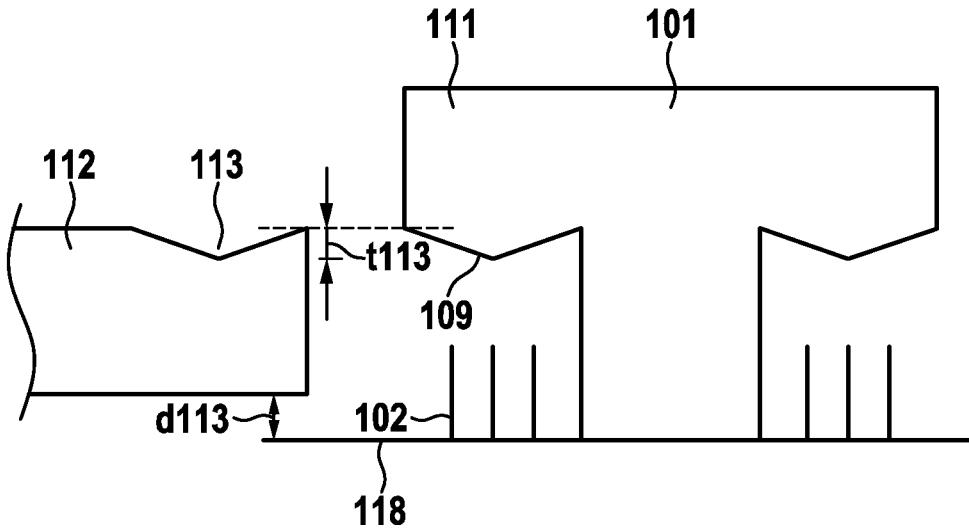
FIG. 7 is a schematic representation of a retaining element and a pipe end.
Figure 8A:
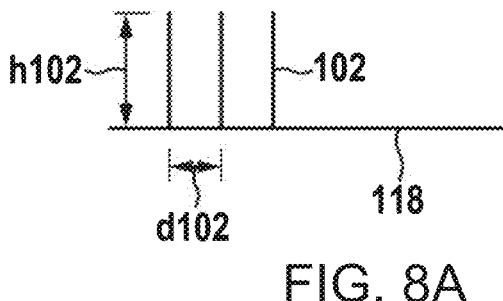
Figure 8B:
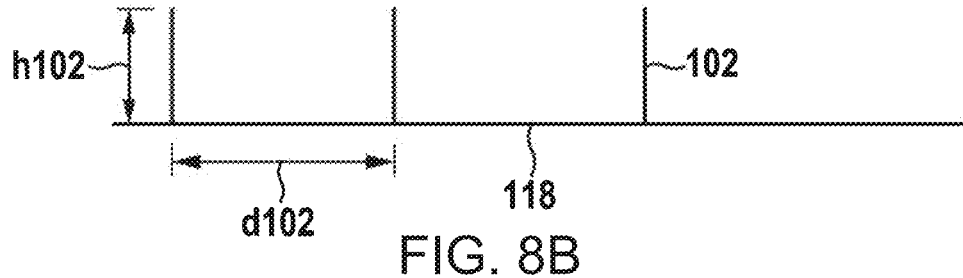
Figure 8C:
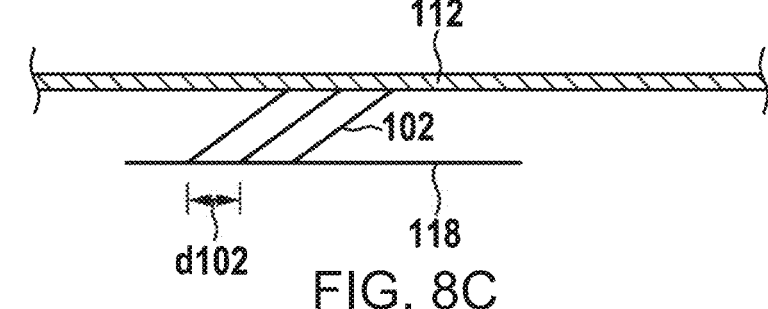
Figure 8D:
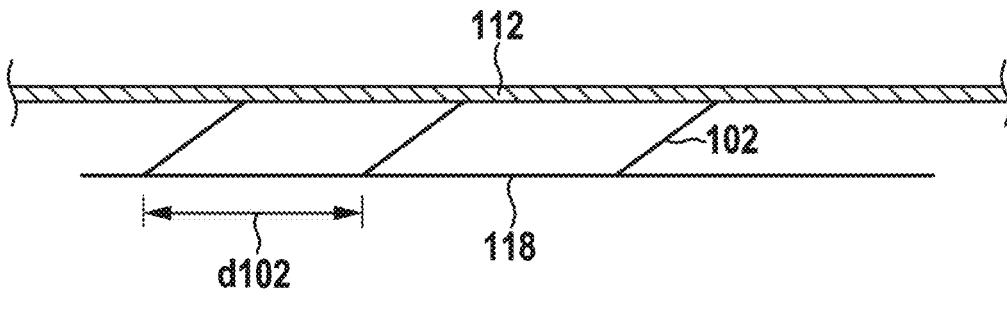

FIGS. 6 and 7 show embodiments of retaining elements 101 according to the invention. The respective retaining elements 101 are not limited to a T-shape shown in the figures, but can also be L-shaped, C-shaped or the like, or have a corresponding shape.

The retaining element 101 may include at least one web 111, as shown in FIGS. 6 and 7. The web 111 may extend above an inner surface 118 of the pipe connector 100 and form a pipe end receptacle 116 with the inner surface 118. The height $h_{111}$ of the web 111 above the inner surface 118 may correspond to a thickness, such as wall thickness, of the pipe 112. When a pipe 112 is inserted into the pipe connector 100 through an insertion opening of the receptacle 114, 115, the pipe end may be or may be received in the pipe end receptacle 116. The retaining member 101 may include a press-on guide 109, such that when the pipe end is inserted into the pipe end receptacle 116, the pipe end is guided toward the inner surface 118 of the pipe connector 100. The press-on guide 109 and/or the retaining element 101 may have a defined press-on point 110. Depending on the dimension of the pipe end receptacle 116, for example the height $h_{111}$ of the web or the height $h_{110}$ of the contact point 110 above the inner side 118, the pipe end may be pressed against the inner side 118 and/or frictionally received in the pipe end receptacle 116. For example, the height $h_{111}$ and/or the height $h_{110}$ may be less than the wall thickness of the pipe 112. Preferably, the height $h_{110}$ of the contact pressure point 110 may be less than the height of the web 111, compare for example FIGS. 6 and 7. The contact press-on guide 109 may extend obliquely at an angle $\alpha_{109}$ as exemplified in FIGS. 6 and 7. The angle $\alpha_{109}$ may be between 1° and 20°, preferably between 1° and 15°. The angle $\alpha_{109}$ may also be such as to result in self-locking of a pipe end inserted or received in the pipe end receiving means 116. The retaining element 101 may be integrally formed with the stop 103. The retaining element 101 may be symmetrical about at least one axis of symmetry, for example $X_{101}$. The tubular connector 100 may be formed symmetrically about at least one axis of symmetry, e.g., $X_{101}$. At least one axis of symmetry of the retaining element 101 may coincide with or be identical to at least one axis of symmetry of the pipe connector 100.

It may be provided that one, more or all of the sealing lips 102 are arranged on the inner side 118 of the pipe connector 100 under the web 111 and/or in the pipe end receptacle 116. This allows the pipe end to be guided to and/or pressed against the sealing lips 102 by the retaining element 101, so that a particularly good seal can result.

As shown schematically by way of example in FIG. 7, the pipe 112 and/or its pipe end can alternatively or additionally be or become clipped to the retaining element 101 or be or become connected with a clip connection and/or snap connection. The retaining element 101 and the pipe 112 and/or the pipe end thereof may have suitable complementary connecting elements 113 for this purpose. The complementary connecting element may be or comprise, for example, a connecting groove 113 of the pipe 112 or the pipe end in which a clip element 110 of the pipe 112 may engage. The clip element 110 may be or comprise, for example, the contact point 110. For this purpose, the depth $t_{113}$ of the groove 113 may be suitably adapted to the geometry of the press-on guide 109, the press-on point 110 and or a suitable connecting element of the retaining element 101. It may be provided that the pipe 112 or the pipe end has a distance $d_{113}$ to the inner side 118 when clipped to the retaining element 101, so that the pipe 112 or the pipe end is not held in the pipe end receptacle 116 in a force-fit, but only via the clip connection. This allows the pipe 112 to be easily separated from the retaining element 101 again. In this case, the distance $d_{113}$ can be small enough that a good leakage seal or fluidic seal with the sealing lips 102 is nevertheless obtained. Alternatively, the respective dimensions, e.g. $h_{110}$, $h_{111}$, $\alpha_{109}$, $t_{113}$, $d_{113}$ and/or of the pipe end receptacle 116 or the like, may be dimensioned such that, in addition to the clip connection, a force fit, a form fit and/or a self-locking of the pipe 112 or of the pipe end in the pipe end receptacle 116 results.

As exemplarily and schematically shown in FIG. 8, the sealing lips 102 can be dimensioned, in particular have a height or length $h_{102}$, and be spaced apart from each other by a distance $d_{102}$ such that they overlap each other at least partially and/or in pairs when the pipe 112 is inserted into the pipe connector 100. In particular, the ratio $d_{102}/h_{102}$ may be <1. However, it may also be provided that the respective distance $d_{102}$ varies depending on the pair of sealing lips or is selected such that at least one, some or all of the sealing lips 102 do not overlap when the pipe 112 is inserted. It may be provided that at least two, more or all sealing lips 102 have an equal or different height $h_{102}$, $h_{103}$, $h_{104}$. Alternatively or additionally, it may be provided that at least one, more or all of the distances $d_{102}$, $d_{103}$ between the corresponding sealing lips are the same or different. It may be provided that at least two, more or all of the sealing lips 102 have a different or equal thickness and/or have an equal or different material. The height, thickness and spacing may be suitably selected so that the sealing lips 102 seal well.

Although three sealing lips 102 are shown in FIGS. 6, 7 and 8, the pipe connector 100 may also have a different number of sealing lips, for example one or more than one sealing lip 102 or exactly two sealing lips 102. The embodiments described and shown in the figures can obviously be suitably adapted.

FIG. 9 shows an exemplary arrangement of a pipe connector 100 according to the invention with two pipes 112 connected thereto. In the exemplary arrangement, a first pipe connector 100 connects a pipe 112 arranged substantially in the horizontal direction to a horizontal deflection piece 112. A vertical deflection piece 112 is connected to the horizontal deflection piece 112 by a further pipe connector 100. Through a third pipe connector 100, a pipe 112 extending substantially in the vertical direction is connected to the vertical deflection piece 112. The respective pipes 112 are thus connected to each other in a fluidically sealing manner by the pipe connectors 100. As shown by way of example in FIG. 9, at least one or all of the pipe connectors 100 may include a flexible region 106. For example, the pipe 112 may have an offset or twist in the horizontal direction relative to the horizontal baffle 112 that may be compensated for by the flexible region 106.

FIGS. 11(A-D) show, by way of example and schematically, two pipes 112 arranged relative to one another and connected by a pipe connector 100 according to the invention. The pipe connector 100 is not shown in FIG. 11. In FIG. 11A, the two pipes 112 are arranged at a distance $d_{190}$ of their pipe ends facing each other. The two pipes 112 are aligned in such a way that their longitudinal axes (indicated in the figure by the dashed horizontal lines) coincide, compare FIG. 11A. The dimension $d_{188}$ may correspond to a characteristic dimension of a first pipe 112, for example a width, a height or a diameter. The dimension $d_{189}$ can correspond to a characteristic dimension of a second pipe 112, for example a width, a height or a diameter. The dimensions $d_{188}$ and $d_{189}$ may be such that the pipes 112 can be received in a receptacle 114, 115 of a pipe connector 100. The two pipes 112 are fluidly connected to, and through, a pipe connector 100 not shown in the figure. The pipe connector 100 may correspond, for example, to an embodiment shown in FIGS. 1 to 5. The distance $d_{190}$ of the two pipe ends may correspond to one or the depth $t_{100}$ of the pipe connector 100. The arrangement illustrated in FIG. 11B differs from that of FIG. 11A in particular in that one of the two pipes 112 is pivoted or rotated relative to the other pipe 112 by an angle $\alpha_{190}$. In this regard, the pipe connector 100 connecting the two pipes 112 may include a flexible region 106 as described above that can compensate for the corresponding angular offset of the two pipes 112. The arrangement shown in FIG. 110 differs from those of FIG. 11A in particular in that one of the two pipes is offset relative to the other pipe 112 by a distance $d_{191}$. The offset may be oriented perpendicular to one or both longitudinal axes of the pipes 112, as shown. In this regard, the pipe connector 100 connecting the two pipes 112 may include a flexible region 106 as described above that can compensate for the corresponding offset of the two pipes 112. The arrangement shown in FIG. 11D differs from that of FIG. 11A in particular in that one of the two pipes 112 or pipe ends is offset relative to the other pipe 112 or pipe end along one or both longitudinal axes of the pipes 112. The offset $d_{193}$ of the two pipes relative to each other can be designed as shown in FIG. 11D in such a way that the distance of the two pipes $d_{192}$ from each other can be smaller than the distance $d_{190}$ and thus possibly also smaller than a depth $t_{100}$ of the pipe connector 100. However, the offset $d_{193}$ of the two pipes relative to each other can also be designed in such a way that the distance of the two pipes $d_{192}$ from each other can be greater than the distance $d_{190}$ and thus possibly also greater than a depth $t_{100}$ of the pipe connector 100 (not shown in FIGS. 11(A-D)). In this regard, the pipe connector 100 connecting the two pipes 112 may comprise a flexible region 106 as described above, which may compensate for the corresponding offset of the two pipes 112 by a compression or stretching action. Of course, arrangements of two or more pipes 112 connectable with a pipe connector 100 are not limited to the examples shown in FIG. 11. Any combination of translation and rotation, for example any combination of the examples shown in FIGS. 11(A-D), is also possible.

The features disclosed in the description, figures and claims may be essential, individually or in any combination, to the realization of the invention.

The invention claimed is:

1. A pipe connector for connecting at least two pipes, the pipe connector comprising:

a first receptacle with a first insertion opening for inserting a pipe; and a second receptacle with a second insertion opening for inserting a pipe, wherein:

the pipe connector has at least one circumferential stop arranged between the first and the second insertion opening on an inner side of the pipe connector, the stop is configured to determine a maximum insertion depth of a pipe into the first and/or second receptacle;

the pipe connector having at least one circumferential sealing lip arranged on the inner side of the pipe connector between the first and/or the second insertion opening and the stop, the circumferential sealing lip being configured to fluidically seal a pipe;

the pipe connector has a flexible region arranged between the first and the second insertion opening and is composed of a deformable, compressible or expandable and/or elastic material, such that the first receptacle can be displaced in a translatory and/or rotatory manner relative to the second receptacle, wherein the flexible region comprises or is at least in part a bellows; and the pipe connector is configured for use in kitchen construction to connect the at least two pipes, wherein the pipe connector has at least one retaining element, which is arranged at or near the stop at least in sections, the retaining element being configured to fix a pipe inserted into the first and/or the second receptacle at least in sections or at points to the pipe connector, wherein the retaining element has a press on guide on a side facing the inner side of the pipe connector, so that a cross section of the pipe end receptacle is tapered at least in sections in the insertion direction of the pipe end.

2. The pipe connector according to claim 1, wherein the retaining element has a T-shape, L-shape or C-shape or the like, wherein a web of the retaining element forms with the inner side of the pipe connector a pipe end receptacle for receiving a pipe end of a pipe inserted into the first and/or the second receptacle.

3. The pipe connector according to claim 2, wherein at least one of the at least one sealing lip is arranged in the pipe end receptacle on the inner side of the pipe connector and/or on the web.

4. The pipe connector according to claim 1, wherein the contact press-on guide is inclined at least in sections relative to the inner side at an angle $\alpha_{109}$, the angle being $0° \leq \alpha_{109} \leq 20°$, particularly $0° \leq \alpha_{109} \leq 15°$, and/or the angle $\alpha_{109}$ causing self-locking in the case of a pipe end received in the pipe receptacle.

5. The pipe connector according to claim 1, wherein the retaining element comprises a clip element such that, when the pipe is received in the pipe end receptacle, the retaining element is releasably connected to the pipe via the clip element with a corresponding complementary connecting element of the pipe end and/or the pipe.

6. The pipe connector according to claim 1, comprising at least one latching element arranged in the first and/or second receptacle on the inner side and adapted to releasably connect the pipe to the pipe connector with a complementary latching lug of a pipe inserted in the receptacle.

7. The pipe connector according to claim 1, comprising at least two axes of symmetry about which the pipe connector and/or the retaining element is axisymmetric, mirror symmetric or rotationally symmetric.

8. The pipe connector according to claim 1, comprising at least two respective sealing lips between a stop and a first receptacle and a second receptacle, wherein the distance $(d_{102})$ between the two respective sealing lips is smaller than a length $(h_{102})$ of the sealing lips.

9. The pipe connector according to claim 1, wherein the flexible region and/or the bellows has angular contours, the height of the contours being greater than the distance between the contours, the flexible region and/or the bellows has at least one outwardly facing contour, particularly exactly three outwardly facing contours.

10. The pipe connector according to claim 1, which has a first, circumferential, stop arranged between the flexible region and the insertion opening of the first receptacle on the inner side of the pipe connector and a second, circumferential, stop arranged between the flexible region and the insertion opening of the second receptacle on the inner side of the pipe connector, circumferential stop arranged between the flexible region and the insertion opening of the second receptacle on the inner side of the pipe connector, the pipe connector having at least one first retaining element arranged at or near the first stop on the inner side at least in sections and at least one second retaining element arranged at or near the second stop on the inner side at least in sections.

11. The pipe connector according to claim 1, comprising at least two sealing lips arranged on the inner side of the first receptacle and/or the second receptacle.

12. The pipe connector according to claim 1, in which the first receptacle and/or the second receptacle has a circumferential insertion chamfer at an outer edge, the cross-sectional surface of the receptacle being tapered at least in sections in the region of the insertion chamfer.

13. The pipe connector according to claim 1, the pipe connector further comprising:

a first receptacle with a first insertion opening for inserting a pipe; and a second receptacle with a second insertion opening for inserting a pipe, wherein:

the pipe connector has at least one circumferential stop arranged between the first and the second insertion opening on an inner side of the pipe connector, the stop is configured to determine a maximum insertion depth of a pipe into the first and/or second receptacle;

the pipe connector having at least one circumferential sealing lip arranged on the inner side of the pipe connector between the first and/or the second insertion opening and the stop;

the pipe connector has a flexible region arranged between the first and the second insertion opening and is composed of a deformable, compressible or expandable and/or elastic material, such that the first receptacle can be displaced in a translatory and/or rotatory manner relative to the second receptacle; and the pipe connector is configured for use in kitchen construction to connect the at least two pipes;

wherein the ratio of a height $(h_{100})$, a width $(b_{100})$ and/or a diameter $(d_{100})$ to a depth $(t_{100})$ is $h_{100}/t_{100} \geq 1.2$, $b_{100}/t_{100} \geq 2.5$ and/or $d_{100}/t_{100} \geq 1.5$.

14. An assembly comprising a pipe connector and at least two pipes connected to the pipe connector via the first and second receptacles, the pipe connector comprising a first receptacle with a first insertion opening for inserting a pipe and a second receptacle with a second insertion opening for inserting a pipe, wherein:

the pipe connector has at least one circumferential stop arranged between the first and the second insertion opening on an inner side of the pipe connector, the stop is configured to determine a maximum insertion depth of a pipe into the first and/or second receptacle;

the pipe connector having at least one circumferential sealing lip arranged on the inner side of the pipe connector between the first and/or the second insertion opening and the stop, the circumferential sealing lip being configured to fluidically seal a pipe;

the pipe connector has a flexible region arranged between the first and the second insertion opening and is composed of a deformable, compressible or expandable and/or elastic material, such that the first receptacle can be displaced in a translatory and/or rotatory manner relative to the second receptacle, wherein the flexible region comprises or is at least in part a bellows; and the pipe connector is configured for use in kitchen construction to connect the at least two pipes;

and further wherein a. the longitudinal axes of the two pipes are oriented relative to each other at an angle between 1° and 15°, and/or b. the pipe ends of the pipes connected to the pipe connector have a distance and/or offset along the longitudinal axis of one or both pipes which is 1 to 2 cm greater or smaller than a depth $t_{100}$ of the pipe connector, and/or C. the two pipes have a distance and/or offset substantially perpendicular to the longitudinal axis of the pipes with respect to each other, in the direction of extension of a height $h_{100}$ of the pipe connector and/or a width $b_{100}$, which is between 1 to 2 cm.

15. The assembly according to claim 14 wherein a. an outer cross-section and/or outer circumference of the pipes is larger than an inner cross-section of at least one of the receptacles), so that at least one pipe is fixed under an interference fit in the at least one receptacle with the pipe connector, and/or b. at least one of the receptacles has on an inner side at least one latching element and at least one of the pipes has at least one latching lug complementary to the latching element, the at least one pipe being releasably fixed in the at least one receptacle by the latching connection formed by the latching element and the latching lug with the pipe connector, and/or c. at least one of the receptacles has on an inner side at least one pipe connector clip element, wherein the at least one pipe is clipped in the at least one receptacle to the pipe connector via the pipe connector clip element; and/or d. the retaining element is connected to an inner side of the pipe connector on, at or in at least one of the receptacles forming the pipe end receptacle, the pipe inserted into the receptacle being received with one pipe end in the pipe end receptacle, the pipe being positively or non-positively connected to the pipe connector via the pipe end and the pipe end receptacle and/or e. the retaining element comprises at least one or said clip member and at least one of said pipes or a pipe end of at least one of said pipes comprises a or said connecting member complementary with said clip member, wherein said pipe is detachably connected to said pipe connector via said clip member and said complementary connecting member.

16. The assembly according to claim 14, the pipe connector further comprising:

a first receptacle with a first insertion opening for inserting a pipe; and a second receptacle with a second insertion opening for inserting a pipe, wherein:

the pipe connector has at least one circumferential stop arranged between the first and the second insertion opening on an inner side of the pipe connector, the stop is configured to determine a maximum insertion depth of a pipe into the first and/or second receptacle;

the pipe connector having at least one circumferential sealing lip arranged on the inner side of the pipe connector between the first and/or the second insertion opening and the stop;

the pipe connector has a flexible region arranged between the first and the second insertion opening and is composed of a deformable, compressible or expandable and/or elastic material, such that the first receptacle can be displaced in a translatory and/or rotatory manner relative to the second receptacle; and the pipe connector is configured for use in kitchen construction to connect the at least two pipes;

wherein the ratio of a height ($h_{100}$), a width ($b_{100}$) and/or a diameter ($d_{100}$) to a depth ($t_{100}$) is $h_{100}/t_{100} \geq 1.2$, $b_{100}/t_{100} \geq 2.5$ and/or $d_{100}/t_{100} \geq 1.5$.

17. A pipe connector for connecting at least two pipes, the pipe connector comprising:

a first receptacle with a first insertion opening for inserting a pipe; and a second receptacle with a second insertion opening for inserting a pipe, wherein:

the pipe connector has at least one circumferential stop arranged between the first and the second insertion opening on an inner side of the pipe connector, the stop is configured to determine a maximum insertion depth of a pipe into the first and/or second receptacle;

the pipe connector having at least one circumferential sealing lip arranged on the inner side of the pipe connector between the first and/or the second insertion opening and the stop, the circumferential sealing lip being configured to fluidically seal a pipe;

the pipe connector has a flexible region arranged between the first and the second insertion opening and is composed of a deformable, compressible or expandable and/or elastic material, such that the first receptacle can be displaced in a translatory and/or rotatory manner relative to the second receptacle, wherein the flexible region comprises or is at least in part a bellows; and the pipe connector is configured for use in kitchen construction to connect the at least two pipes, the pipe connector comprising at least one pipe connector clip element arranged in the first and/or second receptacle, on the inner side, so that the pipe connector can be clipped to a pipe inserted into the first and/or second receptacle.

18. A pipe connector for connecting at least two pipes, the pipe connector comprising:

a first receptacle with a first insertion opening for inserting a pipe; and a second receptacle with a second insertion opening for inserting a pipe, wherein:

the pipe connector has at least one circumferential stop arranged between the first and the second insertion opening on an inner side of the pipe connector, the stop is configured to determine a maximum insertion depth of a pipe into the first and/or second receptacle;

the pipe connector having at least one circumferential sealing lip arranged on the inner side of the pipe connector between the first and/or the second insertion opening and the stop, the circumferential sealing lip being configured to fluidically seal a pipe;

the pipe connector has a flexible region arranged between the first and the second insertion opening and is composed of a deformable, compressible or expandable and/or elastic material, such that the first receptacle can be displaced in a translatory and/or rotatory manner relative to the second receptacle, wherein the flexible region comprises or is at least in part a bellows; and the pipe connector is configured for use in kitchen construction to connect the at least two pipes, wherein the outer surface of the pipe connector is or comprises a stiff and/or hard material having a first E-modulus and the inner surface of the pipe connector is or comprises a soft and/or compliant material having a second E-modulus compared to the material of the outer surface, the first E-modulus being greater than the second E-modulus.

\*  \*  \*  \*  \*